(12) United States Patent
Thomas, III et al.

(10) Patent No.: US 10,620,716 B2
(45) Date of Patent: Apr. 14, 2020

(54) VISIBLY OPAQUE AND NEAR INFRARED TRANSPARENT DISPLAY BORDER WITH UNDERLYING ENCODED PATTERN

(71) Applicant: HEWLETT-PACKARD DEVELOPMENT COMPANY, L.P., Houston, TX (US)

(72) Inventors: Fred Charles Thomas, III, Fort Collins, CO (US); Jonathan D. Bassett, Fort Collins, CO (US); Steven Steinmark, Fort Collins, CO (US); Sean W. Tucker, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/098,124

(22) PCT Filed: Jul. 20, 2016

(86) PCT No.: PCT/US2016/043195
§ 371 (c)(1),
(2) Date: Oct. 31, 2018

(87) PCT Pub. No.: WO2018/017083
PCT Pub. Date: Jan. 25, 2018

(65) Prior Publication Data
US 2019/0138115 A1 May 9, 2019

(51) Int. Cl.
*G06F 3/03* (2006.01)
*G06F 3/041* (2006.01)
*G09F 9/00* (2006.01)
*G06F 3/0354* (2013.01)
*G06F 3/042* (2006.01)

(52) U.S. Cl.
CPC .......... *G06F 3/0317* (2013.01); *G06F 3/0321* (2013.01); *G06F 3/03542* (2013.01); *G06F 3/03545* (2013.01); *G06F 3/041* (2013.01); *G06F 3/042* (2013.01); *G09F 9/00* (2013.01)

(58) Field of Classification Search
CPC .... G06F 3/0317; G06F 3/042; G06F 3/03542; G06F 3/03545; G06F 3/041; G06F 3/0321; G09F 9/00
See application file for complete search history.

(56) References Cited

U.S. PATENT DOCUMENTS

| 5,398,133 A | 3/1995 | Tsai et al. |
| 6,686,910 B2 | 2/2004 | O'Donnell |

(Continued)

FOREIGN PATENT DOCUMENTS

| WO | WO-2007103631 | 9/2007 |
| WO | WO-2014009933 | 1/2014 |

(Continued)

OTHER PUBLICATIONS

The Digital Pen, < http://www.xcallibre.com/products/digital-pen/ >.

*Primary Examiner* — Premal R Patel
(74) *Attorney, Agent, or Firm* — HP Inc. Patent Department (57) ABSTRACT

A display may include a viewing area and a border about the viewing area. The border is visibly opaque and near infrared transparent. An encoded pattern underlies the border.

15 Claims, 6 Drawing Sheets

(56) References Cited

U.S. PATENT DOCUMENTS

| | | | |
|---|---|---|---|
| 9,170,660 B2 | 10/2015 | Takeda | |
| 2002/0126105 A1* | 9/2002 | O'Donnell, Jr. | G06F 3/03545 345/179 |
| 2006/0238517 A1 | 10/2006 | King et al. | |
| 2010/0238138 A1 | 9/2010 | Goertz et al. | |
| 2010/0309168 A1 | 12/2010 | Huang et al. | |
| 2011/0175852 A1 | 7/2011 | Goertz et al. | |
| 2012/0018625 A1* | 1/2012 | McCarthy | G06F 3/042 250/221 |
| 2013/0263032 A1* | 10/2013 | Vainio | G06F 3/04842 715/765 |
| 2014/0092052 A1* | 4/2014 | Grunthaner | G06F 3/044 345/174 |
| 2014/0184507 A1 | 7/2014 | Yamada et al. | |
| 2014/0247404 A1* | 9/2014 | Jarvis | F16F 1/027 349/12 |
| 2015/0138159 A1* | 5/2015 | Kang | G02B 26/026 345/175 |
| 2015/0227227 A1* | 8/2015 | Myers | H04M 1/0268 345/173 |
| 2016/0165027 A1* | 6/2016 | Hahn | H04B 1/38 455/566 |
| 2016/0179221 A1* | 6/2016 | Yamada | G06F 3/0386 345/157 |
| 2016/0364039 A1* | 12/2016 | Yamada | G06F 3/041 |

FOREIGN PATENT DOCUMENTS

| | | |
|---|---|---|
| WO | WO-2015/141105 | 3/2015 |
| WO | WO-2015041362 A1 | 3/2015 |
| WO | WO-2015072977 A1 | 5/2015 |
| WO | WO-2016/010534 | 1/2016 |

\* cited by examiner

VISIBLY OPAQUE AND NEAR INFRARED TRANSPARENT DISPLAY BORDER WITH UNDERLYING ENCODED PATTERN

BACKGROUND

Many electronic devices include displays having viewing areas in which information is visibly presented. Such viewing areas may include an underlying encoded pattern which reflects pulses of near infrared light to indicate a position of an electro-optical pen.

DETAILED DESCRIPTION OF EXAMPLES

The viewing area of most displays is surrounded by a frame or border. In many displays, the border is visibly opaque to conceal underlying electrical traces, connections or componentry. The underlying encoded pattern in the viewing area of a display terminates inwardly spaced from or at the perimeter of the viewing area. In other words, the underlying encoded pattern does not extend beneath the border.

Electro-optical pens may include a nib that contacts the viewing area of the display. Such pens often include a window through which pulses of near infrared light are directed towards the underlying encoded pattern and through which reflections from the underlying encoded pattern are received by a sensor to detect the positioning of the nib. Because the window is often offset from the nib, the sensor may be unable to interact with the encoded pattern that underlies the nib when the nib is positioned against the viewing area along the edge of the border. As a result, input using the electro-optical pen adjacent the edge of the border is limited or not available.

Many displays may be relatively small in size. As a result, the available surface area of the viewing area for providing icons by which commands, selections or other input may be made using the electro-optical pen is limited. Providing such icons for input using the electro-optical pen produces available space of the viewing area for presenting other information or other images.

The present disclosure provides a display that provides an encoded pattern beneath the surface of the border. While remaining visibly opaque so as to continue to conceal underlying electronics, the border is near infrared transparent. As a result, the sensor of the electro-optical pen is able to sense near infrared light reflected off of the encoded pattern beneath the surface of the border and is able to detect the positioning of the electro-optical pen when the nib is along the edge of the border within the viewing area or is positioned on top of and in contact with the upper surface of the border. The display of the present disclosure offers a greater usable area for input of selections or commands using an electro-optical pen.

Figure 1:
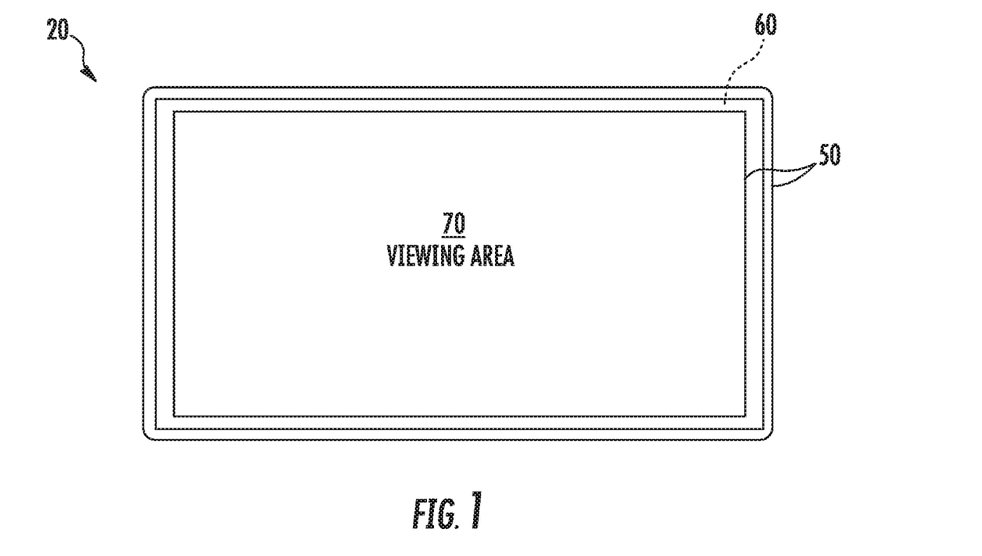
FIG. 1 is a front view of an example display.
Figure 2:
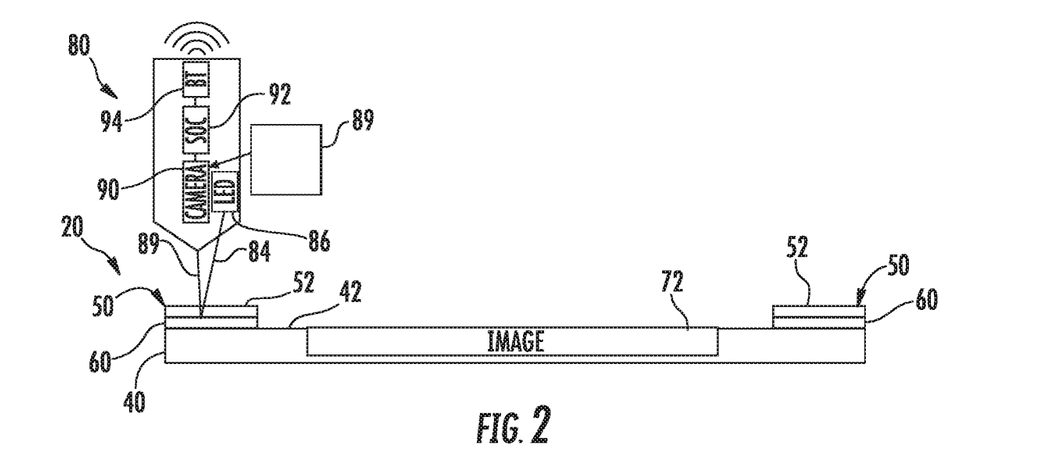
FIG. 2 is a sectional view of the example display of FIG. 1 illustrating the example display interacting with an example electro-optical pen.

FIGS. 1 and 2 illustrate an example display 20. As will be described hereafter, display 20 provides an encoded pattern beneath the front surface of the border surrounding a viewing area. The encoded pattern underlying the border facilitates the detection of the positioning of an electro-optical pen when portions of the electro-optical pen overlie the border. Display 20 comprises image layer 40, border 50 and encoded pattern 60.

Image layer 40 comprises at least one layer of electronic componentry to provide a viewing area 70 in which an image 72 (schematically illustrated) may be presented. In one implementation, image layer 40 comprises liquid crystal display electronics and componentry. In other implementations, image layer 40 comprises other image producing technology that presents optically visible (visible to the human eye) pictures, graphics, icons or other images in viewing area 70.

Border 50 comprises a band or frame extending at least partially about viewing area 70. Border 50 has a front or upper face 52 facing away from image layer 40. Although face 52 is illustrated as being flat and substantially parallel to the front or top face 42 of image layer 40, in other implementations, face 52 may be rounded, stepped or inclined. In some implementations, face 52 may be beveled or may partially extend about viewing area 70 with gaps or openings within or through border 50.

Border 50 is for lied from a material or materials so as to be visibly opaque and near infrared transparent. The term "visibly opaque" means that a material cannot transmit light having a wavelength in the range of 400 nm to 700 nm. In the example illustrated, light having a wavelength of at least 400 nm and no greater than 700 nm cannot pass through border 50. The term "visibly transparent" means that a material can transmit light having a wavelength in the range of 400 nm to 700 nm. The term "near infrared transparent" means that a material is transparent to, is able to transmit, light of at least one wavelength within the spectrum of wavelengths between 700 nm and 1.4 um. For example, a material that transmits any and all wavelengths of light within the range of 700 nm and 1.4 um is "near infrared transparent". Likewise, a material that transmits a narrow range or a narrow subset of wavelengths of light within (that is smaller than) the broader range of 700 nm and 1.4 um is "near infrared transparent". For example, a material that transmits a wavelength of light of 850 nm, but may not transmit other wavelength of light within the range of 700 nm to 1.4 am is "near infrared transparent", In some implementations, border 50 is transmissive to a smaller range of wavelengths of light contained within the larger range of 700 um to 1.4 um, wherein the smaller range of wavelength of light is prescribed by the operational specifications of an electro-optical pen to be used with border 50. Border 50 is sufficiently "near infrared transparent" such that near infrared pulses of wavelengths of light may be transmitted from an infrared emitter of an input stylus or electro-optical (EO) pen, through border 50 and into impingement with encoded pattern 60 and such that near infrared wavelengths of light reflected off the encoded pattern pass once again through border 50 for being sensed by a camera or other sensor of the input stylus or pen. In one implementation, border 50 is black in color to the human eye. In other implementations, border 50 may have other colors.

In one implementation, border 50 comprises a layer of material that is visibly opaque and near infrared transparent adjacent to and along face 52 of border 50. In one implementation, the entire thickness of border 50 comprises a layer visibly opaque near-infrared transparent material. In other implementations, border 50 may comprise a stack of layers which includes a layer of visibly opaque near-infrared transparent material. In such an implementation, any additional layers disposed between the visibly opaque, infrared transparent layer of border 50 and encoded pattern 60 are also near infrared transparent. In such implementations, such additional layers disposed between the visible opaque, infrared transparent layer border 50 and encoded pattern 60 may be visibly transparent.

In yet other implementations, the visibly opaque near infrared transparent layer of border 50 is sandwiched between encoded pattern 60 and other cover layers. In such an implementation, the other cover layer or layers that overlie the visibly opaque near infrared transparent layer are also near infrared transparent. In such an implementation, the other cover layer or layers, while being near infrared transparent, may be visibly opaque or may be visibly transparent.

In one implementation, the visibly opaque near infrared transparent layer of border 50 may comprise a material, such as an ink, commercially available as ADA6212 from H.W. Sands Corporation which has a transmission percentage of less than 10% for wavelengths of electromagnetic radiation up to approximately 680 nm and which drastically increases to a transmission percentage of at least 65% for wavelengths of electromagnetic radiation of 700 nm and to a transmission percentage of at least 85% for wavelengths of electromagnetic radiation of at least 720 nm. In yet another implementation, the visibly opaque near infrared transparent layer of border 50 may comprise a visibly-opaque IR-transmitting (VOIRT) screen ink commercially available as SPECTRE 110 from Epolin which has a transmission percentage of less than 1% for wavelengths of electromagnetic radiation between 200 and 675 nm and which drastically increases to a transmission percentage of at least 70% for wavelengths of electromagnetic radiation greater than 835 nm. In yet another implementation, the visibly opaque near infrared transparent layer of border 50 may comprise a visibly-opaque IR-transmitting (VOIRT) polycarbonate resin commercially available as MAKROLON 2407-970401 (1 mm), 2407-971000 (1 mm) or AX2477-900346 (1 mm) from Bayer Material Science which have transmission percentages of less than 1% for wavelengths of electromagnetic radiation between 400 and 675 nm and which drastically increases to a transmission percentage of at least 90% for wavelengths of electromagnetic radiation greater than 800 nm, 800 nm and 850 nm, respectively. In yet other implementations, other VOIRT materials may be utilized.

Encoded pattern 60 comprises dots or other markings having a pattern or layout that, when "read" by an electro-optical pen, indicate the positioning of the nib of the electro-optical pen. Encoded pattern 60 serves as a coordinate system. In one implementation, encoded pattern 60 is provided by a dot film secured beneath face 52 of border 50. In one implementation, encoded pattern 60 comprises near infrared reflective dots or markings on a near-infrared absorbing background. Reflective in the context means reflective back at the pen or stylus where the NIR irradiance is coming from and the NIR viewing imager is located. This type of refection is termed backscattered reflection, retro-reflection or diffuse reflection. Absorbing in this context can be to actually absorb the NIR irradiance or to reflect it directionally in a manner such that the reflected NIR irradiance is not reflected back at the pen. Specular or mirror-like reflection would do this for most tilt orientations of the pen. For example in one embodiment the pattern (dots) would diffusely reflect the NIR irradiance and the background would absorb via transmission into the chassis of the display as well as absorb via specular reflection of the NIR irradiance away from the pen. In yet other implementations, encoded pattern 60 comprises near-infrared absorbing dots or markings on a near infrared reflective background. The same expanded definitions of reflection and absorption as described above hold for this embodiment as well.

Figure 3:
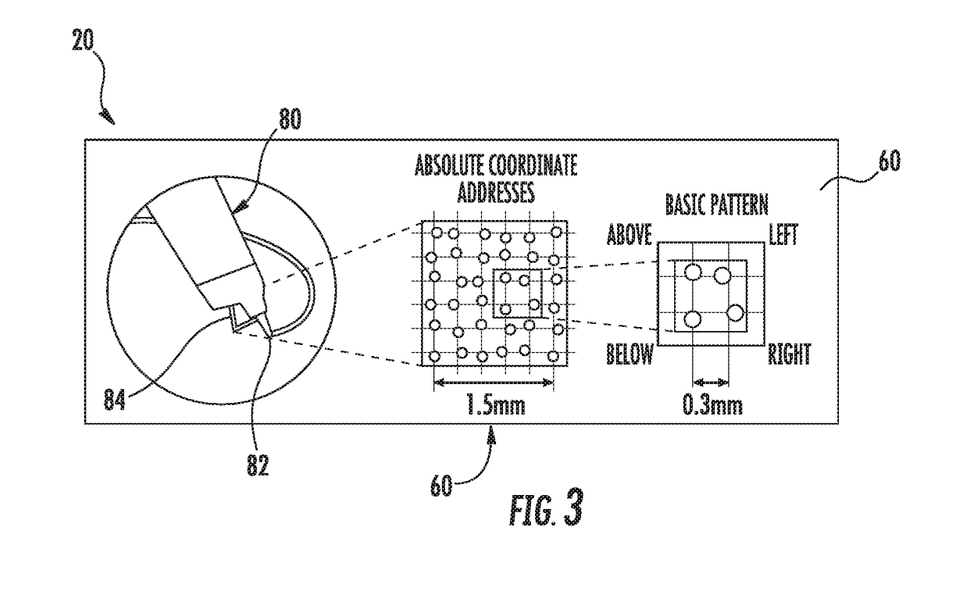
FIG. 3 is an enlarged plan view of a portion of the display of FIG. 1, illustrating an encoded pattern that interacts with the electro-optical pen.

In one implementation, encoded pattern 60 comprises dots that are positioned relative to one another for a 6×6 array that encode the pens absolute position two within plus –150 µm. The encoded pattern of dots provides a resolution of approximately 20 µm or 1335 lines print. In one implementation, the dots of encoded pattern 60 have an average pitch of approximate 300 µm. FIG. 3 illustrates one example of encoded pattern 60 as captured and read by an example electro-optical pen 80 having a pointer or nib 82 and a near-infrared transmitting and receiving window 84. In other implementations, encoded pattern 60 may comprise other coordinate systems or patterns of clots or markings.

In the example illustrated, encoded pattern 60 extends beneath border 50. In one implementation, encoded pattern 60 extends at least 5 mm outwards from the edge of viewing area 70 towards the outer periphery or edge of border 50. In other implementations, encoded pattern 60 may extend a greater distance from the edge of viewing area 70 towards the outer edge of border 50. In some implementations, encoded pattern 60 may extend beneath an entirety of face 52 of border 50. As will be described hereafter, in yet other implementations, encoded pattern 60 may extend beneath viewing area 70 as well. In some implementations, encoded pattern 60 may extend along a band adjacent to and along border 50 within viewing area 70. In yet other implementations, as illustrated hereafter, encoded pattern 60 may cover an entirety of viewing area 70 while extending beyond viewing area 70 beneath border 50.

Figure 4:
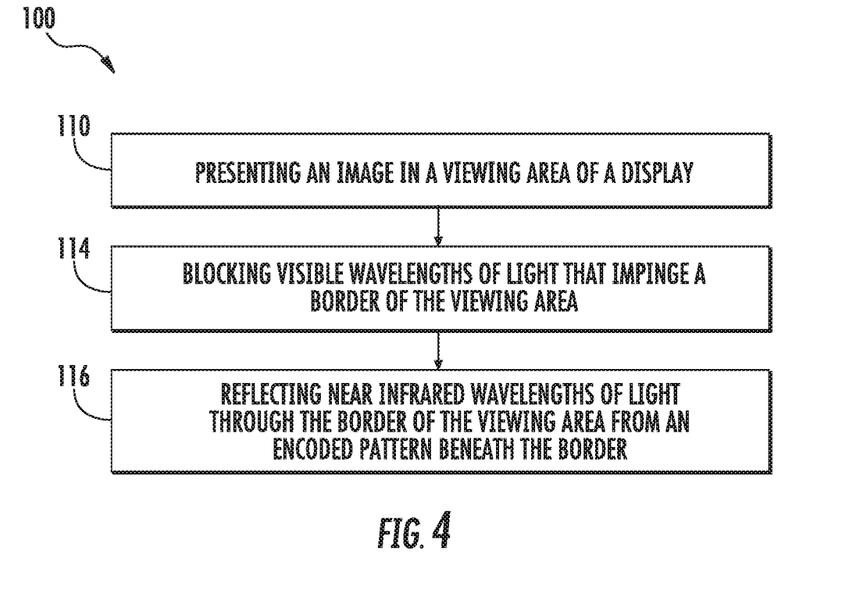
FIG. 4 is a flow diagram of an example method for use of the example display.

FIG. 4 is a flow diagram of an example method 100 that may be carried out using a display of the present disclosure. Although method 100 is described as being carried out by display 20, it should be recognized that method 100 may be carried out by any of the displays described in the present disclosure or by other displays having a visibly opaque near-infrared transparent border extending about a viewing area and over and encoded pattern. As indicated by block 110 in FIG. 4, display 20 presents image 72 in a viewing area 70.

As indicated by block 114 in FIG. 4, border 50 of viewing area 70 blocks visible wavelengths of light that impinge the border 50. At the same time, as indicated by block 116, near infrared wavelengths of light are reflected through border 50 from encoded pattern 60 beneath border 50. As a result, the border 50 appears black or some other opaque color to a person using display 20. At the same time, an electro-optical pen is able to "see-through" border 50 and sense the underlying encoded pattern to determine its position and to determine what input is being selected by the person manipulating the pen when the pen is positioned over border 50. In some implementations, as pen 80 is moved across the viewing area (with the position of the pen being detected as it is being moved), a text or graphic is "drawn" in the viewing area, simulating writing or drawing on the screen with the pen.

FIG. 2 schematically illustrates the example electro-optical pen 80 which directs near infrared wavelengths of light through border 50 and into impingement with encoded pattern 60, wherein the near infrared wavelengths of light are reflected back through border 50 and are sensed by pen 80. As shown by FIG. 2, pen 80 comprises a near infrared light emitter in the form of a light-emitting diode 86.

In one implementation, the near-infrared light has a wavelength of approximately 850 nm and LED pulse on duration of approximately 1/10,000 of a second (100 microseconds) at a repetition rate of 30 Hz. In other implementations, the near-infrared light may be provided at other near-infrared wavelengths, other durations and other frequencies. The near-infrared light 88 passes through face 52 of border 50 and is reflected off of encoded pattern 60.

The pattern of reflected near infrared light 89 is captured by a sensing device in the form of a camera 90. In one implementation, camera 90 comprises a 100×100 element CMOS imager. Via an imaging lens (provided at window 84, shown in FIG. 3), camera 90 views a 14×14 array of positionally encoded dots. From a larger set, the pen firmware 92 selects and uses an array of 6×6 dots to determine the location of the pen tip or nib 82 (shown in FIG. 3). In the example illustrated, the determined position is transmitted by a transmitter 94 to other remote componentry of display 20 and/or the computing or processing system associated with display 20. In one implementation, transmitter 94 comprises a Bluetooth emitter. In other implementations, pen 80 may comprise other electronic componentry and may operate in other fashions to capture an image of the encoded pattern 60 of dots and to determine the position of nib 82 using the captured image.

Figure 5:
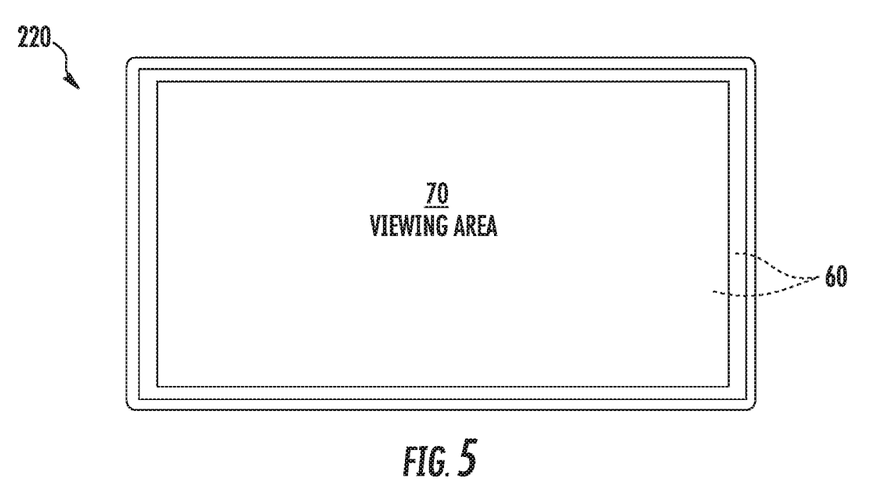
FIG. 5 is a front view of another example display.
Figure 6:
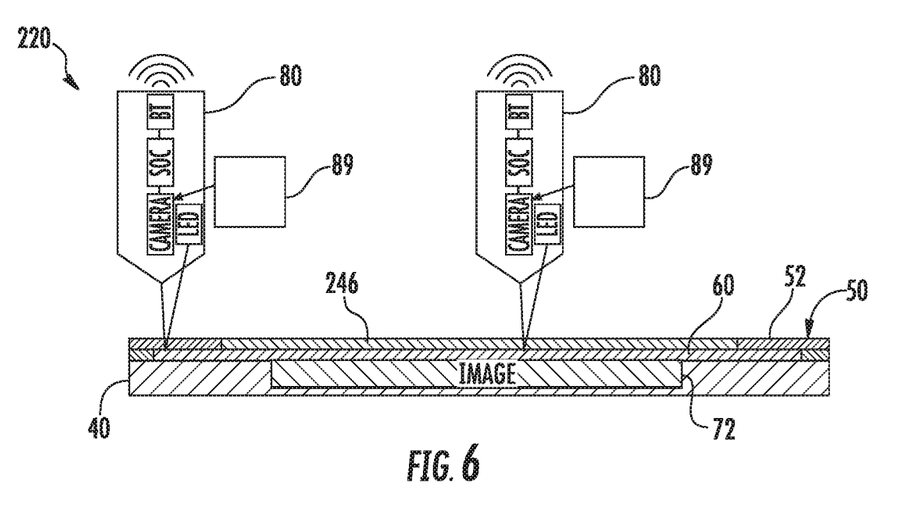
FIG. 6 is a sectional view of the example display of FIG. 5 illustrating the example display interacting with example electro-optical pens.

FIGS. 5 and 6 illustrate display 220, a particular implementation of display 20. Display 220 is similar to display 20 described above except that encoded pattern 60 of display 220 is illustrated as continuously extending across the entirety of viewing area 70, in addition to extending below a majority of a width of border 50. Encoded pattern 60 is covered or protected by an overlying transparent layer 246 which may comprise an optically or visibly transparent glass or an optically or visibly transparent polymer.

In one implementation, encoded pattern 60 extends at least from the edge of viewing area 70 outwards away from the center of viewing area 70 by a distance sufficient to underlie a near infrared transmission and capture window of an electro-optical pen when the nib (the point) of the stylus or pen is positioned against (and in contact with) the edge of border 50 at the edge of viewing area 70. In one implementation, encoded pattern 60 may extend at least 5 mm beyond the edge of viewing area 70 below border 50. In one implementation, encoded pattern 60 may extend beneath the entirety of border 50. Those remaining components of display 220 which correspond to components of display 20 are numbered similarly or are shown in FIGS. 1-3.

As shown by FIG. 6, encoded pattern 60 extends over any images 72 presented by imaging layer 40. The size of the individual marks or dots of encoded pattern 60 are sufficiently small so as to not substantially interfere with the viewing of image 72 (other than possibly a slight graying or darkening of the display screen). Display 220 facilitates the use of encoded pattern 60 to determine the positioning of pen 80 and the selected input as designated by the positioning of pen 80 when pen 80 is positioned over viewing area 70 and any images 72. Display 220 further facilitates the use of encoded pattern 60 to determine the positioning of pen 80 and the selected input as designated by the positioning of pen 80 when pen 80 is positioned over border 50.

Figure 7:
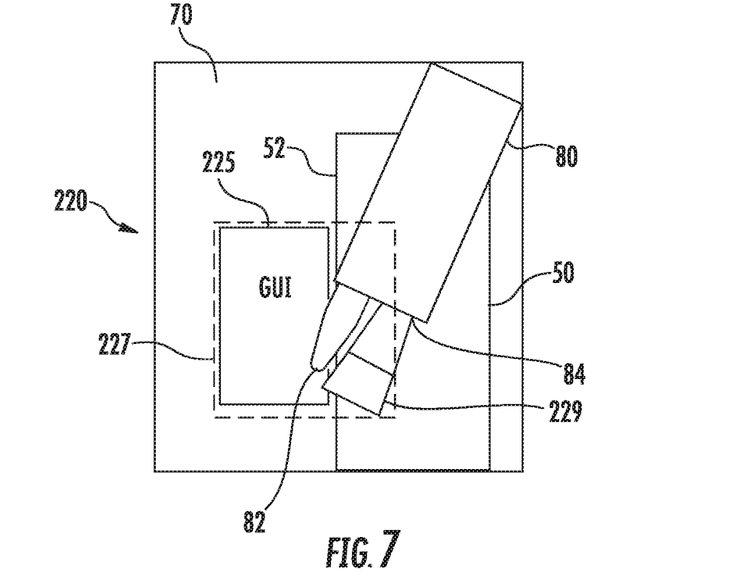
FIG. 7 is an enlarged fragmentary view of the display of FIG. 5 illustrating interaction of an electro-optical pen along a border of the display.

FIG. 7 illustrates the use of display 220 when nib 82 of pen 80 is in contact with viewing area 70 proximate to the inner edge 52 of border 50. In some implementations, a program may present an image, icon, link, text or other graphical user interface 225 within viewing area 70 along edge 72. Positioning of nib 82 in contact with or over graphical user interface to 25 may correspond to an input to the system employing display 220. To accommodate the positioning of nib 82 adjacent to edge 52 over the graphical user interface 225, system 220 associates an area 227 (indicated by broken lines) of dots of the encoded pattern 60 that encloses the graphical user interface 225 of viewing area 70 and that additionally extends beyond edge 52 beneath border 50 with the graphical user interface 225. As a result, pen 80 may accurately identify the positioning of nib 82 as being in contact with graphical user interface 225 even though pen 80 may be capturing a region 229 of encoded pattern 60 outside of viewing area 70 and outside of the portion of encoded pattern 60 directly underlying the graphical user interface 225 being presented in viewing area 70.

In some implementations, the positioning of pen 80 is tracked, wherein the images presented by the display include a line corresponding to prior detective positions of nib 82 such that pen 80 "draws" a line across viewing area 70 in response to the nib 82 being slid across viewing area 70. In such circumstances, the extension of encoded pattern 60 beneath border 50 facilitates such "drawing" by pen 80 closer to the actual physical edge of border 50. As a result, a greater portion of viewing area 70 may be drawn upon by pen 80.

Figure 8:
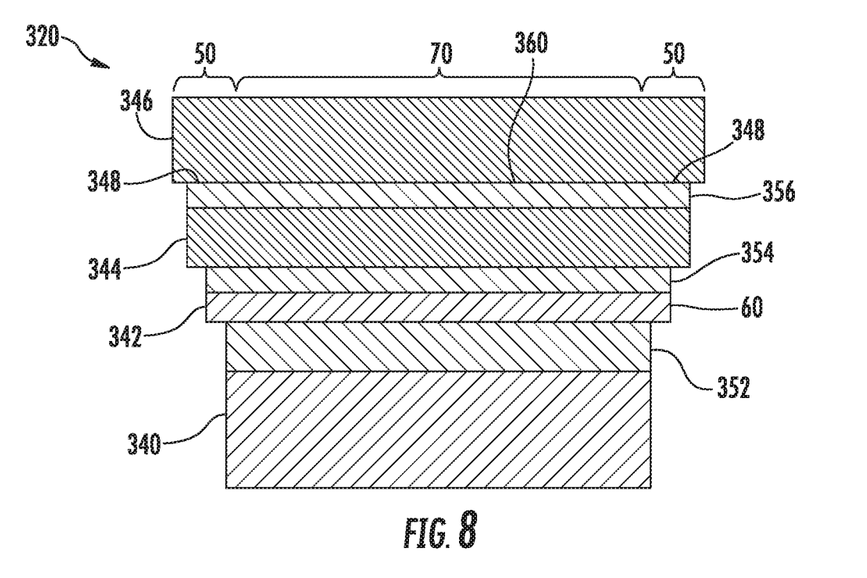
FIG. 8 is a sectional view of another example display.

FIG. 8 is a sectional view of a portion of an example display 320, a particular implementation of display 20. Display 320 comprises imaging layer 340, dot film 342 providing encoded pattern 60, sensor glass 344, cover glass 346 and visibly opaque near-infrared transparent coating or layer 348 providing border 50. Imaging layer 340 is similar to imaging layer 40 described above. In one implementation, imaging layer 340 may comprise liquid crystal diode pixels. In other implementations, imaging layer 340 may comprise other imaging technologies.

Dot film 342 is adhered in front or on top of imaging layer 340 by an intermediate transparent adhesive layer 352. Dot film 342 provides encoded pattern 60 described above. Sensor glass 344 comprises a visible or optically transparent layer of glass or other visibly transparent material adhered in front of or on top of dot film 342 by adhesive layer 354. Sensor glass 344 covers and protects dot film 342 and imaging layer 340. Cover glass 346 comprises a layer of glass or other visibly transparent material, such as a transparent polymer, extending across and on top of sensor glass 344. Cover glass 346 is adhered to sensor glass 344 by adhesive layer 356. Cover glass 346 forms the border of the display and supports visibly opaque near-infrared transparent coating or layer 348.

Layer 348 extends on a face of cover glass 346 between cover glass 346 and sensor glass 344. Layer 348 is coated upon face 360 of cover glass 346 and extends over portions of dot film 342. Interior edges of layer 348 border and define the interior viewing area 70. In other implementations, layer 348 may alternatively be formed on the top outermost face of cover glass 346. In yet other implementations, layer 348 may alternatively be formed on either major face of sensor glass 344. In particular implementations, layer 348 may be formed from any of the VOIRT materials described above with respect to border 50.

Figure 9:
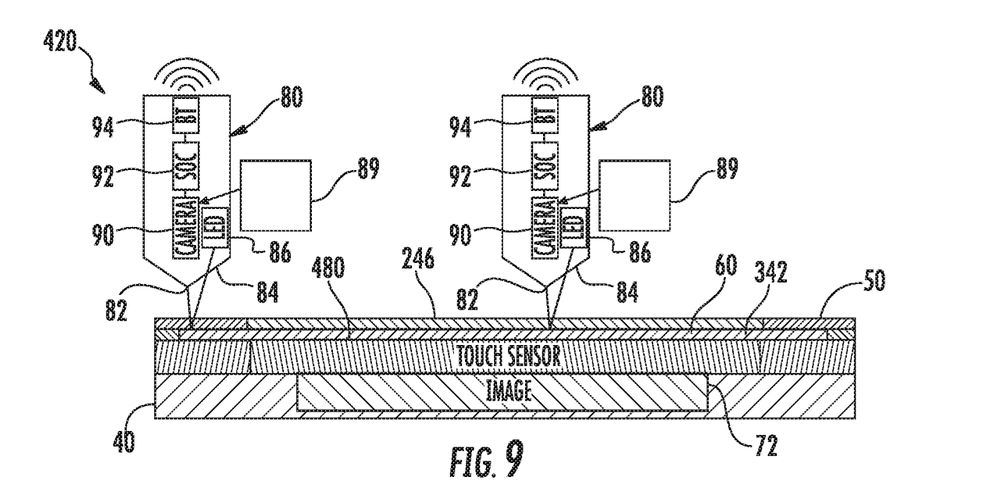
FIG. 9 is a sectional view of another example display.
Figure 10:
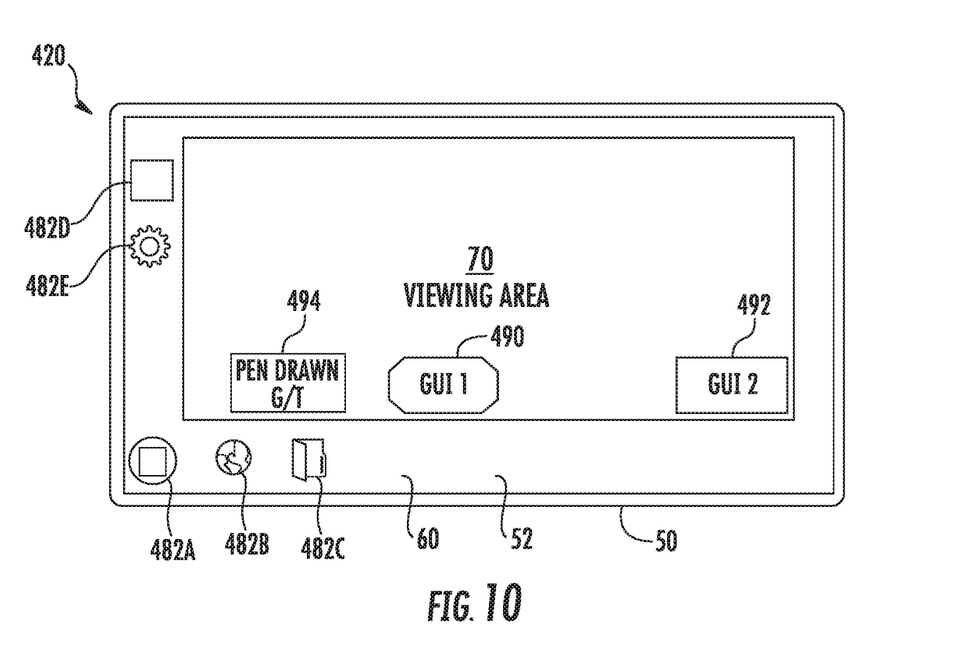
FIG. 10 is a front view of the example display of FIG. 9.

FIGS. 9 and 10 illustrate display 420, another example implementation of display 20. Display 420 is similar to display 220 except that display 420 additionally comprises touch sensor 480 and graphic input interfaces 482A, 482B, 482C, 482D and 482E (collectively referred to as graphic input interfaces 482). Those remaining elements of display 420 which correspond to elements of display 20 or display 220 are numbered similarly.

Touch sensor 480 comprises a touch sensitive interface panel which outputs electrical signals in response to being touched, such as being touched by a person's finger or in response to being touched or contacted by the tip, point or nib of an input stylus or electro-optical pen, such as nib 82 of pen 80 described above. In the example illustrated, touch sensor 480 extends within viewing area 70 while underlying a dot film 342 forming encoded pattern 60. In the example illustrated, touch sensor 480 overlies image layer 40. In other implementations, touch sensor 480 may be omitted.

Graphic input interfaces 482 comprise graphics that are printed, laminated, coated or otherwise provided on border 50, overlying portions of encoded pattern 60 that extend beneath border 50. In one implementation, interfaces 42 are formed on top of surface 52 of border 50. In other implementations, interfaces 42 may be covered by at least one visibly or optically transparent layer, wherein the layer is also near-infrared transparent.

In one implementation, each of graphic input interfaces 482 comprises an outline of an icon or other graphic, wherein the nib 42 of the electro-optical pen, such as pen 80, may be positioned within the outline to provide input. In another implementation, each of interfaces 482 comprises a solid visibly opaque graphic that is also near infrared transparent. For example, in one implementation, each of interfaces 482 may comprise a visibly opaque near-infrared transparent ink printed or otherwise coated upon border 50. In one implementation, the visibly opaque near-infrared transparent ink form each of interfaces 482 has colors different than that of border 50.

Each of graphic input interfaces 482 are provided at predefined distinct locations or over predefined distinct sets of dots of encoded pattern 60 below border 50. In response to a detection or determination that the nib 82 of an electro-optical pen is located over a set of dots of encoded pattern 60, the electro-optical pen may output signals triggering execution of a particular command or selection corresponding to the overlying interface 482. For example, in response to pen 80 transmitting near-infrared light through interface 482D, wherein the pulses of near-infrared light are reflected and captured by pen 82 indicate nib 42 is over interface 482D, the pen 80 may output signals which trigger and operation corresponding to interface 482D (in the example illustrated, a print command). Alternatively, unique sets/patterns of dots may be reserved for communication of underlying commands or selections universally and response to such detection or determination triggers execution of said commands or selections while concurrently providing local position orientation as well.

The provision of graphic input interface 42 facilitates the input of commands using pen 80 and the underlying portions of encoded pattern 60 along border 50. As a result, border 50 provides an additional area that serves as an input interface, preserving the available area of viewing area 70 for the presentation of more dynamic, changing or program specific graphical user interfaces 490, 492 in viewing area 70. Such graphic user interfaces 490, 492 may be selected using the interaction of the pen 80 with those portions of encoded pattern 60 underlying the graphical user interfaces 490, 492 or using touch sensor 480. As further shown by FIG. 10, display 420 facilitates the constant presentation of the more application universal or static interfaces 482 (interfaces for commands or selections that do not change or lose relevance in spite of different applications or programs being executed and presented in the viewing area 70) while preserving viewing area 70 for being drawn upon by pen 80. In the example illustrated, the movement of pen 80 across viewing area 70 (based upon the determined positioning of nib 82 of pen 80 using encoded pattern 60) is tracked, wherein such tracking is displayed in viewing area 70 and results in a pen drawn graphic or text 494 (schematically illustrated).

Although graphical user interfaces 482A, 482B, 482C, 482D and 482E are shown as the start command, an open Internet connection command, an open file command, a print command and a settings command, respectively, in other implementations, display 420 may be provided with additional, fewer or alternative commands or selections along border 50. In some implementations, interface 42 may be provided along a single side of border 50 or may be provided continuously about border 50. In yet other implementations, interface 482 may be omitted.

Figure 11:
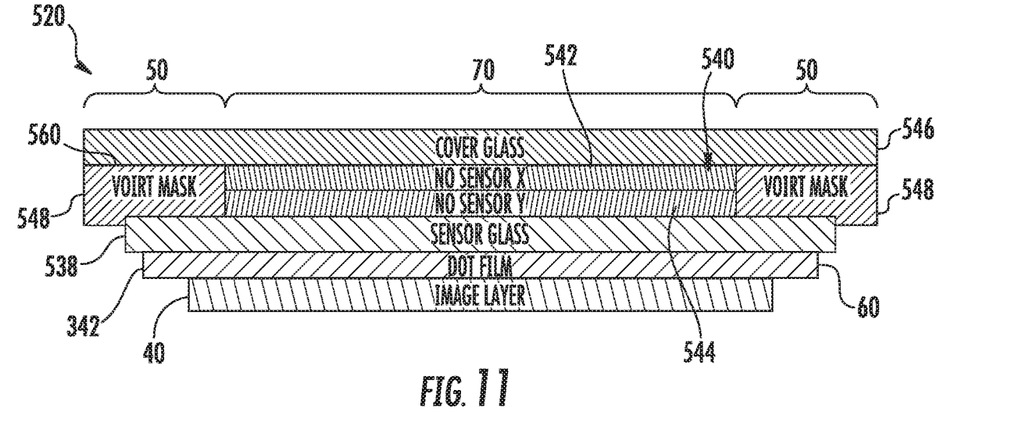
FIG. 11 is a sectional view of another example display.

FIG. 11 is a sectional view illustrating display 520, another example implementation of display 20. Display 720 is similar to display 420 except that the encoded pattern 60 is provided by a dot film that underlies the touch sensor of display 520. Those components or elements of display 520 which correspond to components or elements of any of the above-described displays are numbered similarly.

Display 520 comprises image layer 40, dot film 342 providing encoded pattern 60, sensor glass 538, touch sensor 540, cover glass 546 and visibly opaque near-infrared transparent mask or layer 548. As shown by FIG. 11, dot film 342 providing encoded pattern 60 is laminated between sensor glass 538 and image layer 40. Sensor glass 344 covers and protects touch sensor 540. In the example illustrated, touch sensor 540 is secured on top of sensor glass 344 with touch sensor 540 sandwiched between sensor glass 538 and cover glass 546. In one implementation, touch sensor 540 comprises an indium tin oxide touch sensor films 542, 544 for sensing in X and Y coordinates, respectively. In other implementations, touch sensor 540 may comprise other touch sensitive sensing technologies.

Cover glass 546 comprises a layer of glass or other transparent material, such as a transparent polymer, extending across and on top of touch sensor 540. Cover glass 546 forms the border of the display and supports visibly opaque near-infrared transparent coating or layer 548.

Layer 548 extends on a face of cover glass 546 between cover glass 546 and dot film 542. Layer 548 is coated upon face 560 of cover glass 546 and extends over portions of dot film 538. Interior edges of layer 548 border and define the interior viewing area 70. In other implementations, layer 548 may alternatively be formed on the top outermost face of cover glass 546. In particular implementations, layer 548 may be formed from any of the VOIRT materials described above.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A display comprising:
a viewing area, wherein the viewing area corresponds to an image layer;
an encoded pattern embedded in a dot film, wherein the dot film is adhered to the image layer;
a sensor glass adhered to the dot film, opposite the image layer; and
a border about the viewing area, the border being visibly opaque and near infrared transparent and adhered to the sensor glass opposite the dot film.

2. The display of claim 1, wherein the encoded pattern continuously extends from within the viewing area to beneath the border.

3. The display of claim 2, wherein the encoded pattern extends at least 5 mm beyond the viewing area beneath the border.

4. The display of claim 1, wherein the encoded pattern extends in the viewing area, the display further comprising a touch sensor in the viewing area.

5. The display of claim 1, wherein the encoded pattern contains positional information readable by an infrared emitter/receiver of an electrical optical pen to indicate a position of the electro optical pen.

6. The display of claim 5, wherein the border comprises:
a visibly transparent layer; and
a visibly opaque, near infrared transparent layer between the visibly transparent layer and the encoded pattern beneath the border.

7. The display of claim 1, wherein the border comprises:
a visibly transparent layer; and
a visibly opaque, near infrared transparent layer between the visibly transparent layer and the encoded pattern beneath the border.

8. The display of claim 1, further comprising a graphic on the border over the encoded pattern underlying the border.

9. The display of claim 8, wherein the graphic comprises a visibly opaque, near infrared transparent layer.

10. The display of claim 8, wherein the graphic indicates an input selection corresponding to a graphical user interface within the viewing area, wherein the input selection is adjacent to the viewing area within the border area coinciding with the encoded pattern underlying the border proximate the graphic.

11. The display of claim 1, wherein encoded pattern comprises near infrared reflective dots over a near infrared absorptive background.

12. The display of claim 1, wherein encoded pattern comprises near infrared absorptive dots over a near infrared reflective background.

13. A method comprising:
presenting an image in a viewing area of display, wherein the viewing area corresponds to an image layer;
reflecting near infrared wavelengths of light through the border of the viewing area from an encoded pattern beneath the border, wherein the encoded pattern is embedded in a dot film and the dot film is adhered to the image layer and a sensor glass opposite the image layer; and
blocking visible wavelengths of light that impinge a border of the viewing area of the display, wherein the border of the viewing area is adhered to the sensor glass opposite the dot film.

14. The method of claim 13, wherein the near infrared wavelengths of light are reflected from the encoded pattern through the border area of the viewing area to an input pointer while the input pointer is in contact with the viewing area of the display.

15. A display comprising:
a viewing area, wherein the viewing area corresponds to an image layer;
an encoded pattern embedded in a dot film, wherein the dot film is adhered to the image layer;
a touch sensor in the viewing area, wherein the touch sensor corresponds to a sensor glass adhered to the dot film, opposite the image layer; and
a border about the viewing area, the border being visibly opaque and near infrared transparent and adhered to the sensor glass opposite the dot film.

* * * * *